US010633080B2

(12) United States Patent
Huynh et al.

(10) Patent No.: US 10,633,080 B2
(45) Date of Patent: Apr. 28, 2020

(54) ELECTRONICALLY CONTROLLED ROTARY ACTUATOR FOR AN AIRCRAFT CONTROL SURFACE

(71) Applicant: The Boeing Company, Chicago, IL (US)

(72) Inventors: Neal Van Huynh, Bellevue, WA (US); Patrick Joseph McCormick, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 633 days.

(21) Appl. No.: 15/216,963

(22) Filed: Jul. 22, 2016

(65) Prior Publication Data

US 2018/0022441 A1    Jan. 25, 2018

(51) Int. Cl.
*B64C 13/40* (2006.01)
*B64C 13/50* (2006.01)
*B64C 13/36* (2006.01)
*F15B 15/12* (2006.01)
(Continued)

(52) U.S. Cl.
CPC .............. *B64C 13/40* (2013.01); *B64C 13/36* (2013.01); *B64C 13/50* (2013.01); *B64C 13/504* (2018.01); *F15B 15/12* (2013.01); *F15B 15/18* (2013.01); *F15B 15/202* (2013.01); *F15B 2211/20515* (2013.01); *F15B 2211/633* (2013.01); *F15B 2211/6336* (2013.01); *F15B 2211/6651* (2013.01); *F15B 2211/6653* (2013.01); *F15B 2211/6656* (2013.01); *Y02T 50/44* (2013.01); *Y02T 50/54* (2013.01)

(58) Field of Classification Search
CPC ......... B64C 13/40; B64C 13/50; B64C 13/36; B64C 13/504; F15B 15/18; F15B 15/202; F15B 15/12; F15B 2211/20515; F15B 2211/6336; F15B 2211/6651; F15B 2211/6653; F15B 2211/6656; F15B 2211/633; Y02T 50/54; Y02T 50/44
See application file for complete search history.

(56) References Cited

U.S. PATENT DOCUMENTS 4,979,700 A    12/1990  Tiedeman et al.
5,054,374 A    10/1991  Scobie et al.
(Continued)

FOREIGN PATENT DOCUMENTS

EP    0465282 A1    1/1992
EP    0715084 A1    6/1996

OTHER PUBLICATIONS

Extended European Search Report, dated Nov. 3, 2017, regarding Application No. 17171100.5, 7 pages.
(Continued)

*Primary Examiner* — Assres H Woldemaryam
(74) *Attorney, Agent, or Firm* — Yee & Associates, P.C.

(57) ABSTRACT

A method and apparatus for positioning a control surface. A desired position for the control surface associated with an aerodynamic aircraft structure is identified. The control surface is moved to the desired position using an electronically controlled rotary actuator system located inside of the aerodynamic aircraft structure, wherein a shape of the aerodynamic aircraft structure with the electronically controlled rotary actuator system has a desired aerodynamic performance.

24 Claims, 13 Drawing Sheets

(51) Int. Cl.
*F15B 15/18* (2006.01)
*F15B 15/20* (2006.01)

(56) References Cited

U.S. PATENT DOCUMENTS

| | | | | |
|---|---|---|---|---|
| 5,098,043 | A * | 3/1992 | Arena | B64C 13/26 |
| | | | | 244/215 |
| 5,178,030 | A * | 1/1993 | Bousquet | B64C 13/36 |
| | | | | 74/424.9 |
| 9,108,715 | B2 | 8/2015 | Kordel et al. | |
| 2003/0080246 | A1 | 5/2003 | Koizumi et al. | |
| 2012/0211598 | A1 | 8/2012 | Lutke et al. | |
| 2014/0001309 | A1* | 1/2014 | Tieys | B64C 13/28 |
| | | | | 244/99.3 |
| 2014/0238226 | A1* | 8/2014 | Kim | F01C 9/002 |
| | | | | 92/2 |
| 2014/0238227 | A1* | 8/2014 | Kim | F15B 15/02 |
| | | | | 92/2 |
| 2014/0238228 | A1* | 8/2014 | Sobolewski | B64C 13/40 |
| | | | | 92/2 |
| 2014/0238229 | A1* | 8/2014 | Sobolewski | F15B 15/125 |
| | | | | 92/2 |
| 2014/0238230 | A1* | 8/2014 | Kim | F15B 15/06 |
| | | | | 92/33 |
| 2014/0238231 | A1* | 8/2014 | Kim | F15B 15/125 |
| | | | | 92/33 |
| 2015/0000515 | A1* | 1/2015 | Sobolewski | F15B 15/125 |
| | | | | 92/33 |
| 2016/0097407 | A1* | 4/2016 | Kopecek | F15B 15/12 |
| | | | | 92/25 |
| 2016/0129991 | A1* | 5/2016 | Schwartz | B64C 13/30 |
| | | | | 244/99.3 |
| 2017/0057620 | A1* | 3/2017 | Kossentini | B64C 9/02 |
| 2017/0335932 | A1* | 11/2017 | Nguyen | B64C 13/28 |

OTHER PUBLICATIONS

"Skytronics Incorporated, "Geared Rotary Actuator," copyright 2015, obtained May 25, 2016. http://www.skytronicsinc.com/ca_product_sheets/Geared Rotary Actuator-Boeing 757 LEF Overhaul.pdf".

* cited by examiner

ELECTRONICALLY CONTROLLED ROTARY ACTUATOR FOR AN AIRCRAFT CONTROL SURFACE

BACKGROUND INFORMATION

1. Field

The present disclosure relates generally to aircraft and, in particular, to control surfaces for the aircraft. Still more particularly, the present disclosure relates to a method and apparatus for controlling a position of the control surfaces for the aircraft.

2. Background

Control surfaces on an aircraft are used by a pilot of the aircraft to control movement of the aircraft. The control surfaces allow the pilot to control the movement of the aircraft about three axes that are perpendicular to each other.

For example, flaps are mounted on a trailing edge of each wing of the aircraft. Positions of the flaps are controlled to change curvature of the wings, which in turn changes lift in the wings. As another example, a rudder is located on the trailing edge of a vertical stabilizer. A position of the rudder may be changed to cause a nose to yaw to the right or left.

The position of these and other control surfaces on the aircraft are typically controlled using aircraft control surface systems that employ linear actuators. A linear actuator has a rod attached to a control surface. The linear actuator may push or pull the control surface with the rod to move the control surface to a desired position.

Aircraft are being designed and manufactured with higher aspect ratios and thinner wing airfoil sections. The use of the linear actuators in the aircraft introduces limitations in reducing the thickness of a wing for the aircraft. The linear actuators may require more non-value-added structural space to enable spatial integration of the system equipment and suffer an aerodynamic performance penalty.

Therefore, it would be desirable to have a method and apparatus that take into account at least some of the issues discussed above, as well as other possible issues. For example, it would be desirable to have a method and apparatus that overcome a technical problem with the space needed in an aerodynamic structure for an aircraft control surface system to move a control surface.

SUMMARY

An embodiment of the present disclosure provides an aircraft control surface system. The aircraft control surface system is comprised of a control surface associated with an aerodynamic aircraft structure and an electronically controlled rotary actuator system. The electronically controlled rotary actuator system is located inside of the aerodynamic aircraft structure. Further, the electronically controlled rotary actuator system is associated with the control surface and moves with variable pressure to position the control surface during operation of the electronically controlled rotary actuator system. A shape of the aerodynamic aircraft structure with the electronically controlled rotary actuator system has a desired aerodynamic performance.

Another embodiment of the present disclosure provides an aircraft control surface system. The aircraft control surface system is comprised of a control surface, a rotary actuator, a hydraulic pump, an electric motor system, a housing, and a controller. The control surface is associated with an aerodynamic aircraft structure. The rotary actuator has an output shaft that is moveable. The hydraulic pump is connected to the rotary actuator, wherein the hydraulic pump sends fluid into the rotary actuator. The electric motor system operates to cause the hydraulic pump to send the fluid into the rotary actuator resulting in the output shaft moving the control surface with a variable pressure towards a desired position. The housing contains the rotary actuator, the hydraulic pump, and the electric motor system. The controller receives a position command comprising the desired position for the control surface and sends a command to the electric motor system using the position command. The command is selected to cause the electric motor system to operate the hydraulic pump to send the fluid into the rotary actuator such that the output shaft moves the control surface towards the desired position.

Yet another embodiment of the present disclosure provides a method for positioning a control surface. A desired position for the control surface associated with an aerodynamic aircraft structure is identified. Further, the control surface is moved to the desired position using an electronically controlled rotary actuator system located inside of the aerodynamic aircraft structure, wherein a shape of the aerodynamic aircraft structure with the electronically controlled rotary actuator system has a desired aerodynamic performance.

Still another embodiment of the present disclosure provides a hybrid rotary actuator system. The hybrid rotary actuator system comprises a rotary actuator, an electrohydraulic servo valve, a remote electronic unit, and an electric hydraulic backup system. The rotary actuator is connected to a control surface, wherein the rotary actuator is configured to move the control surface. The electrohydraulic servo valve controls fluid sent into and out of the rotary actuator. The remote electronic unit controls the electrohydraulic servo valve using a position command. The electric hydraulic backup system comprises a hydraulic pump, an electric motor system, an inlet shutoff valve, and a motor driver. The hydraulic pump pumps fluid through the electrohydraulic servo valve. The electric motor system is configured to control the hydraulic pump. The inlet shutoff valve connects the central hydraulics systems to the electrohydraulic servo valve. The motor driver is controlled by the remote electronic unit when the hydraulic rotary actuator system does not operate as desired. The remote electronic unit is configured to shutoff a connection to the central hydraulics systems. The motor driver is configured to control the electric motor system. The electric hydraulic backup system is a backup to the hydraulic rotary actuator system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
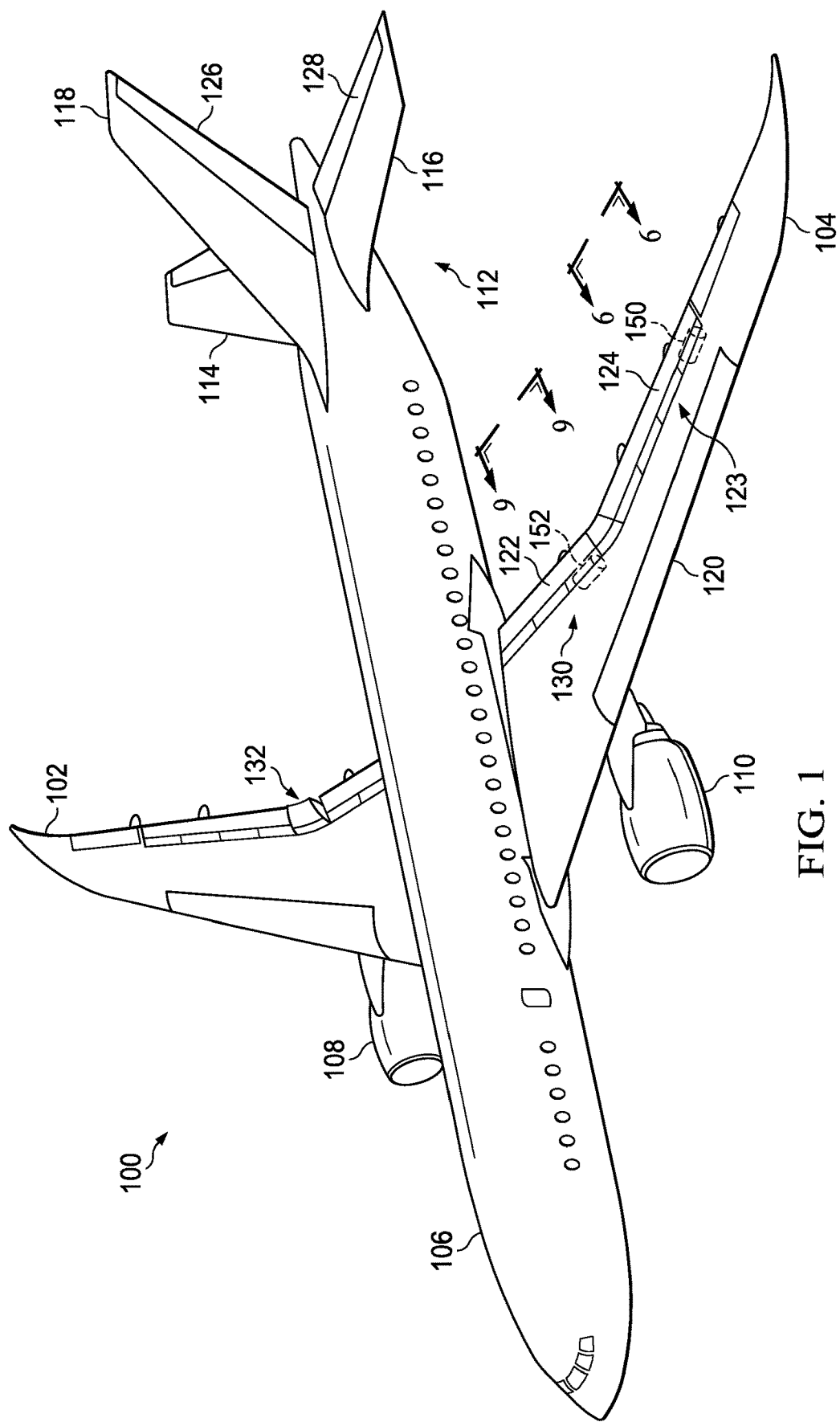
FIG. 1 is an illustration of an aircraft in accordance with an illustrative embodiment.

The illustrative embodiments recognize and take into account one or more different considerations. For example, the illustrative embodiments recognize and take into account that geometry and practical limitations in a direction of force generated by a linear actuator resulting in large hinge moments are needed to position a control surface. The large hinge movements often result in large horn radii. These large horn radii require space with a geometry that often results in the linear actuator or other components connecting the linear actuator to the control surface protruding out of the bottom of a wing.

As a result, the illustrative embodiments recognize and take into account that an outer mold line (OML) of the bottom of the wing may not have a shape that provides a level of aerodynamic performance that meets a standard. The illustrative embodiments recognize and take into account that the protrusion of these components may be handled by using fairings to reduce drag. However, as the shapes and thicknesses of wings change, the drag associated with using the fairings may not result in a desired level of aerodynamic performance from the wing.

The illustrative embodiments also recognize and take into account that aircraft market demands have prompted an original equipment manufacturer (OEM) to reduce manufacturing time of aircraft, as well as reducing the cost to build said aircraft. The illustrative embodiments recognize and take into account that one option to achieve these goals is by replacing one of the central hydraulic actuation systems that moves control surfaces for the aircraft with an electric actuation system. Replacing one or more central hydraulic systems on the aircraft also results in performance improvements in terms of weight and engine shaft power extraction. Further, the use of an electric actuation system reduces the complexity and effort needed to route power to aircraft systems, thus increasing ease in installation and maintenance functionality.

The illustrative embodiments also recognize and take into account that original equipment manufacturers may design airplane flight control systems with hybrid actuation systems that use different types of power for increased safety if a loss occurs in a central hydraulic system for actuators. For example, the illustrative embodiments recognize and take into account that electrical power becomes the backup actuation power for the central hydraulic system.

Thus, the illustrative embodiments provide a method and apparatus for a rotary actuator system for controlling a position of a control surface for an aircraft. In one illustrative example, an aircraft control surface system comprises the control surface and an electronically controlled rotary actuator system. The control surface is associated with an aerodynamic aircraft structure.

The electronically controlled rotary actuator system is located inside the aerodynamic aircraft structure. The electronically controlled rotary actuator system is associated with the control surface and moves with variable pressure to position the control surface during operation of the electronically controlled rotary actuator system, and a shape of the aerodynamic aircraft structure with the rotary actuator system has a desired aerodynamic performance.

When one component is "associated" with another component, the association is a physical association. For example, a first component, such as a control surface, may be considered to be physically associated with a second component, such as an aerodynamic aircraft structure, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, an extension of the second component, or both.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104. Body 106 has tail section 112. Horizontal stabilizer 114, horizontal stabilizer 116, and vertical stabilizer 118 are attached to tail section 112 of body 106.

Aircraft 100 is an example of an aircraft in which an electronically controlled rotary actuator system may be implemented to control positioning of control surfaces for aircraft 100. The positioning of the control surfaces for aircraft 100 means that the control surfaces may be moved to at least one of different positions or different orientations to change the operation of aircraft 100.

As depicted, the control surfaces include, for example, leading edge flap 120, trailing edge flap 122, aileron 124, rudder 126, elevator 128, spoiler 130, and flaperon 132. The use of the electronically controlled rotary actuator system allows for increased aerodynamic performance for aerodynamic aircraft structures selected from at least one of wing 102, horizontal stabilizer 114, vertical stabilizer 118, or other aerodynamic aircraft structures on aircraft 100.

As used herein, the phrase "at least one of", when used with a list of items, means different combinations of one or more of the listed items may be used and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B and ten of item C; four of item B and seven of item C; or other suitable combinations.

In this illustrative example, an electronically controlled rotary actuator system (not shown) may be located in section 150 in wing 104 of aircraft 100. The electronically controlled rotary actuator system may be used to move aileron 124 to different positions during operation of aircraft 100. Further, the electronically controlled rotary actuator system also may be located in section 152 in wing 104 of aircraft 100. The electronically controlled rotary actuator system may be used to move trailing edge flap 122 to different positions during the operation of aircraft 100.

As depicted, aircraft 100 is a commercial airplane and is shown to present one illustrative example of an aircraft in which the electronically controlled rotary actuator system may be implemented to provide a desired level of aerodynamic performance in the aerodynamic aircraft structures. Other illustrative examples may be implemented in other types of aircraft, including, but not limited to, a military aircraft, a rotorcraft, an unmanned aerial vehicle (UAV), or some other suitable type of aircraft that has an aerodynamic aircraft structure with control surfaces.

Figure 2:
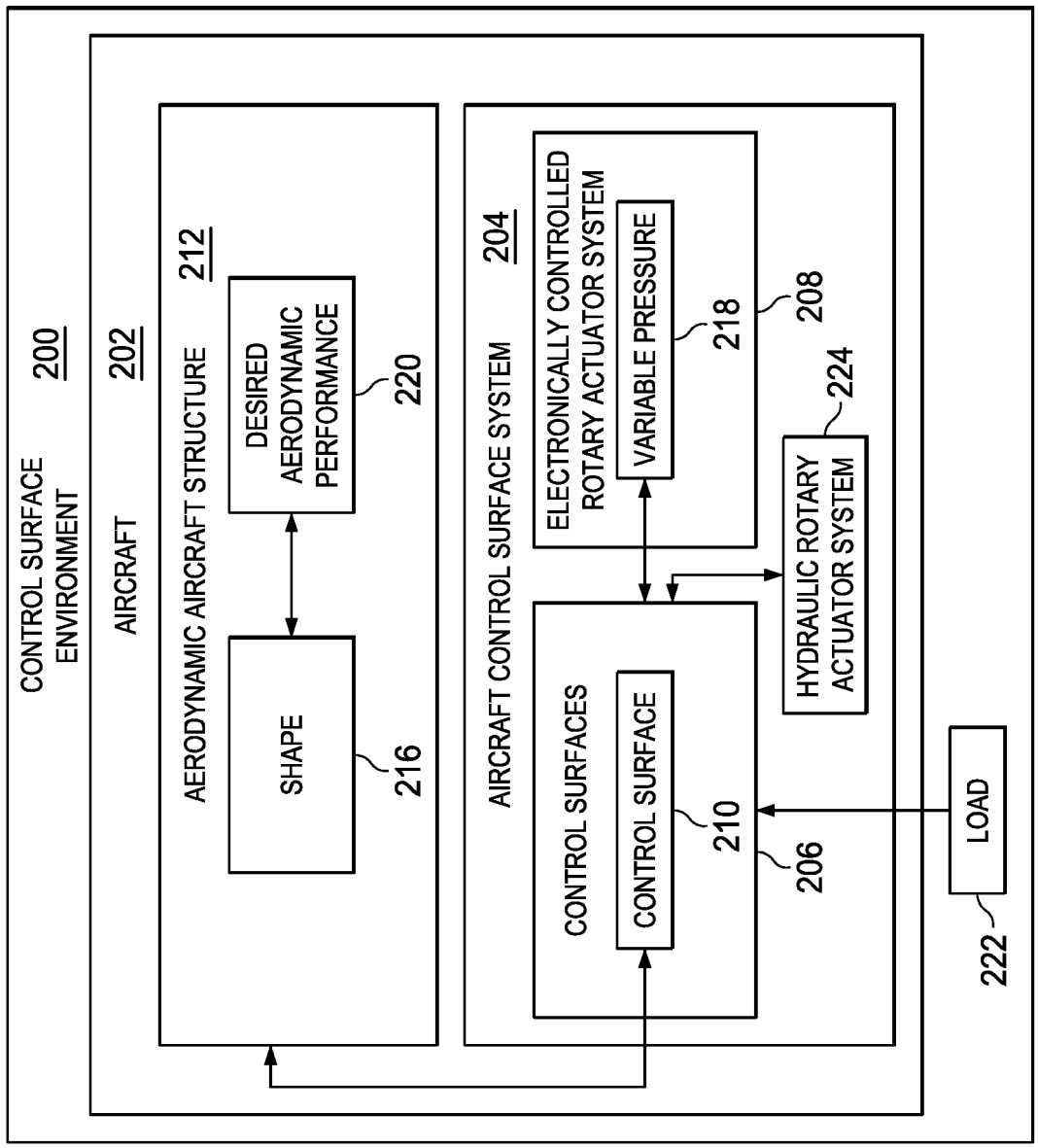
FIG. 2 is an illustration of a block diagram of a control surface environment in accordance with an illustrative embodiment.

With reference now to FIG. 2, an illustration of a block diagram of a control surface environment is depicted in accordance with an illustrative embodiment. In this illustrative example, control surface environment 200 includes aircraft 202. Aircraft 100 in FIG. 1 is an illustration of one manner in which aircraft 202 shown in block form in this figure may be implemented.

As depicted, aircraft control surface system 204 for aircraft 202 includes control surfaces 206 and electronically controlled rotary actuator system 208. As depicted, electronically controlled rotary actuator system 208 is configured to position one or more of control surfaces 206 of aircraft 202.

In this illustrative example, control surface 210 in control surfaces 206 is associated with aerodynamic aircraft structure 212. Control surface 210 may be selected from one of a flap, a slat, a flaperon, an aileron, a rudder, an elevator, a spoiler, and some other suitable type of control surface.

Aerodynamic aircraft structure 212 may take different forms. For example, aerodynamic aircraft structure 212 may be selected from one of a wing, a horizontal stabilizer, a vertical stabilizer, or some other suitable aerodynamic aircraft structure that may have control surfaces 206.

Electronically controlled rotary actuator system 208 is associated with aerodynamic aircraft structure 212. In this illustrative example, electronically controlled rotary actuator system 208 is located inside of aerodynamic aircraft structure 212.

As depicted, electronically controlled rotary actuator system 208 is associated with control surface 210. Electronically controlled rotary actuator system 208 moves control surface 210 with variable pressure 218 to position control surface 210 during the operation of electronically controlled rotary actuator system 208.

Shape 216 of aerodynamic aircraft structure 212 with electronically controlled rotary actuator system 208 has desired aerodynamic performance 220. For example, aerodynamic aircraft structure 212 may have drag, strength, stall speed, lift, or other parameters that meet specifications. The specifications may be those for performing different functions, fuel efficiency, sound, or other suitable factors.

For example, when aerodynamic aircraft structure 212 is a wing, the bottom of the wing may have an outer mold line (CML) shape that has better aerodynamic performance as compared to using a linear actuator. For example, a protrusion in the outer mold line on the bottom side of the wing may be reduced or eliminated. As a result, the size of a fairing may be reduced or the use of the fairing may be avoided. As a result, the drag on the wing is reduced as compared to using the fairing.

Further, electronically controlled rotary actuator system 208 with variable pressure 218 also may provide desired aerodynamic performance 220. For example, electronically controlled rotary actuator system 208 with variable pressure 218 may take into account different amounts of load 222 that may be applied to control surface 210. For example, as the distance over which control surface 210 moves, load 222 from air flowing over control surface 210 may increase. Also, different speeds may affect the amount of load 222 on control surface 210. These different distances and speeds may occur during different phases of flight of aircraft 202.

With variable pressure 218 in electronically controlled rotary actuator system 208, electronically controlled rotary actuator system 208 may move control surface 210 at a desired rate, maintain control surface 210 at a desired position, or some combination thereof. In the illustrative example, variable pressure 218 changes as load 222 in control surface 210 varies in a manner that provides desired movement of control surface 210 that results in desired aerodynamic performance 220.

Electronically controlled rotary actuator system 208, in the illustrative example, overcomes a technical problem with the space needed in an aerodynamic structure for an aircraft control surface system to move a control surface. The illustrative example provides one or more technical solutions that allows for the aerodynamic structures to have a desired shape. For example, a wing may be thinner using electronically controlled rotary actuator system 208 as compared to using a linear actuator system.

In one illustrative example, electronically controlled rotary actuator system 208 may function as a backup to hydraulic rotary actuator system 224. In this manner, two different sources of energy may be used such that if one source of energy fails, control surface 210 may still be moved to desired positions. As depicted, hydraulic rotary actuator system 224 is powered using fluid from a centralized hydraulic system. Electronically controlled rotary actuator system 208 uses electrical power and is located more locally with respect to control surface 210.

Figure 3:
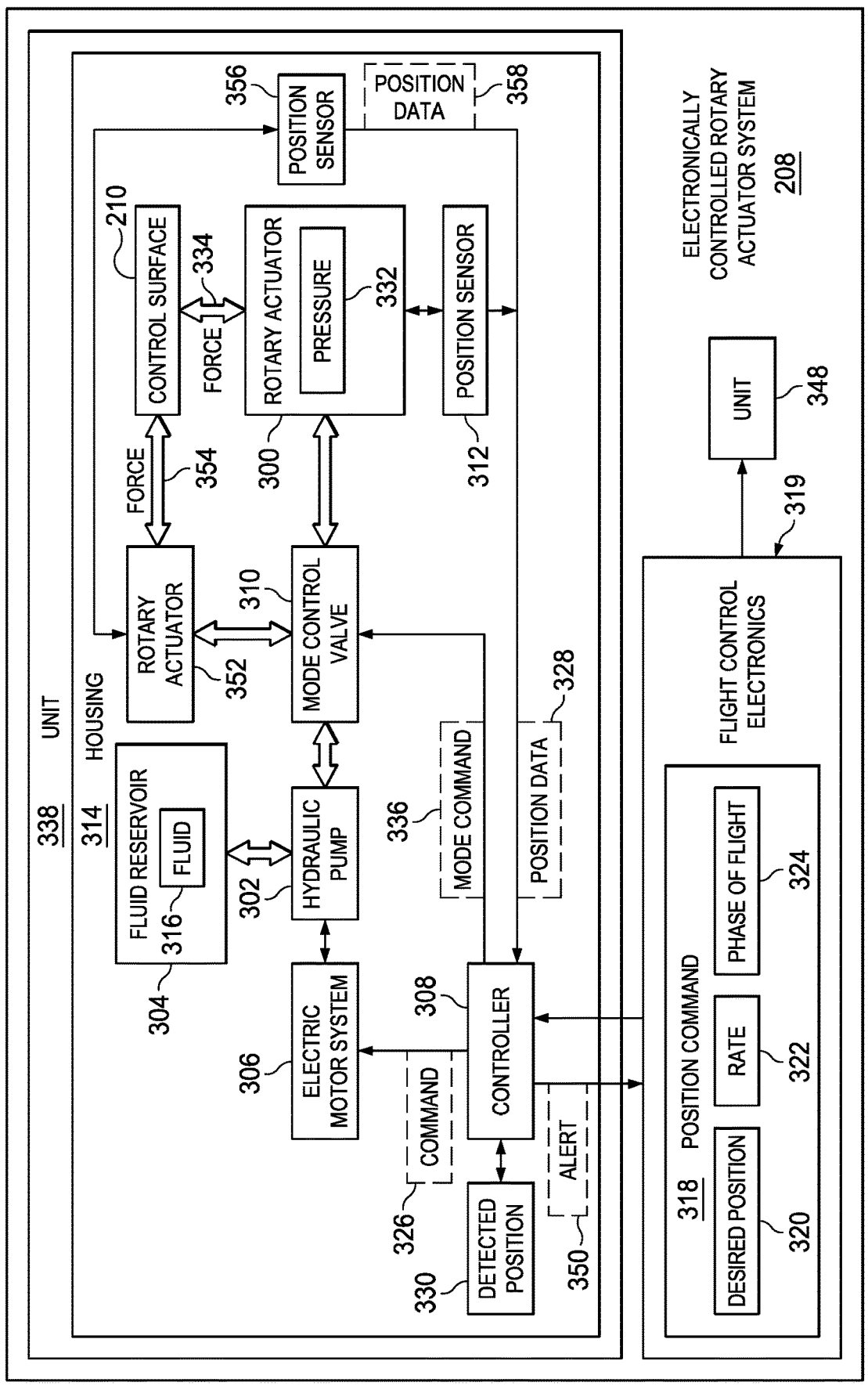
FIG. 3 is an illustration of a block diagram of an aircraft control system in accordance with an illustrative embodiment.

With reference next to FIG. 3, an illustration of a block diagram of an aircraft control system is depicted in accordance with an illustrative embodiment. In the illustrative examples, the same reference numeral may be used in more than one figure. This reuse of a reference numeral in different figures represents the same element in the different figures.

In the illustrative example, electronically controlled rotary actuator system 208 includes a number of components. As depicted, electronically controlled rotary actuator system 208 also includes rotary actuator 300, hydraulic pump 302, fluid reservoir 304, electric motor system 306, controller 308, mode control valve 310, position sensor 312, and housing 314.

In this example, rotary actuator 300 generates rotational movement and moves to change a position of control surface 210. In this example, rotary actuator 300 moves in a clockwise or counterclockwise motion depending on the manner in which fluid 316 is pumped into rotary actuator 300. Rotary actuator 300 may be implemented using any type of currently available rotary actuator that uses fluid 316 to operate. For example, rotary actuator 300 may be implemented using a piston, a vane, a curved vane, a helical spine, a rack-and-pinion, a bladder, or other mechanisms that can be used to generate rotational movement.

As depicted, hydraulic pump 302 is connected to rotary actuator 300 and sends fluid 316 into rotary actuator 300. Hydraulic pump 302 is a mechanical source of power to run rotary actuator 300. Hydraulic pump 302 converts mechanical power into hydraulic energy through pressure or flow of fluid 316.

In this illustrative example, fluid 316 is pumped into rotary actuator 300 to cause movement of rotary actuator 300 or to maintain a position of rotary actuator 300 in response to load 222 on control surface 210 in FIG. 2. In this example, the connection to rotary actuator 300 is an indirect connection through mode control valve 310.

As depicted, fluid 316 is stored in fluid reservoir 304. In this illustrative example, fluid 316 is a hydraulic fluid. Fluid 316 may be any type of fluid or a combination of types of fluids that may be used to cause the movement of rotary actuator 300. For example, fluid 316 may include at least one of a mineral oil, a synthetic hydrocarbon, or some other type of fluid.

Electric motor system 306 runs to operate hydraulic pump 302 such that hydraulic pump 302 sends fluid 316 into rotary actuator 300. This movement results in control surface 210 moving towards a desired position.

Controller 308 controls the movement of rotary actuator 300. This control of rotary actuator 300 is an indirect control through controlling the operation of electric motor system 306 and hydraulic pump 302.

As depicted, controller 308 receives position command 318. In this illustrative example, position command 318 is received from flight control electronics 319. Flight control electronics 319 are flight control computers for aircraft 202 in FIG. 2. In other illustrative examples, position command 318 may originate from a source in addition to or in place of flight control electronics 319. Another source may be, for example, a fly-by-wire control system, flight deck avionics, or some other suitable system for aircraft 202.

In this example, position command 318 comprises desired position 320 for control surface 210. Position command 318 may also include at least one of rate 322, phase of flight 324, or other information that may be used to control the operation of electric motor system 306 to operate rotary actuator 300.

As depicted, rate 322 is the rate at which control surface 210 should move. For example, rate 322 may be ten degrees per second.

Phase of flight 324 is a phase of flight for aircraft 202 that is present when control surface 210 is to be moved. Phase of flight 324 is selected from one of taxiing, takeoff, ascent, cruising, descent, landing, and other suitable phases of flight that aircraft 202 in FIG. 2 may use.

In the illustrative example, controller 308 controls the operation of electric motor system 306 which in turn operates to control how hydraulic pump 302 pumps fluid 316 into rotary actuator 300. For example, controller 308 sends command 326 to electric motor system 306 using position command 318. In turn, electric motor system 306 operates to run hydraulic pump 302.

As depicted, command 326 controls at least one of speed or direction in which electric motor system 306 operates. Command 326 may be selected from one of a current command, a voltage command, or some other suitable type of command that controls the operation of electric motor system 306.

In this illustrative example, a feedback loop is present between controller 308 and rotary actuator 300. Position sensor 312 detects the position of rotary actuator 300 and sends position data 328 back to controller 308. Position data 328 includes a detected position for rotary actuator 300 and may be used to identify the position for control surface 210. In other words, the position of rotary actuator 300 identified from position data 328 may be used to calculate or estimate detected position 330 of control surface 210. Further, a change in the position of control surface 210 identified over time using position data 328 may also be used to identify the rate of change in the position of control surface 210.

Controller 308 adjusts command 326 sent to electric motor system 306 using detected position 330 for control surface 210. For example, controller 308 may adjust command 326 based on whether control surface 210 has reached desired position 320 as estimated from position data 328. As another example, an adjustment to command 326 may be used to change the rate at which rotary actuator 300 moves control surface 210 based on the rate of movement of rotary actuator 300 identified from position data 328. For example, when command 326 is a current command, the current command may be used to change the amount current to control the speed at which electric motor system 306 operates.

In this illustrative example, pressure 332 in rotary actuator 300 may be changed during the operation of rotary actuator 300. Pressure 332 may result from load 222 in FIG. 2 on control surface 210. Load 222 opposes the movement of rotary actuator 300 in a desired direction, causes rotary actuator 300 to move, or some combination thereof.

Pressure 332 may be varied in rotary actuator 300 by controller 308 changing command 326. For example, when command 326 is the current command, the speed at which electric motor system 306 operates may be changed by changing the amount of current that is commanded to be used in electric motor system 306.

By changing pressure 332 using hydraulic pump 302, controller 308 changes force 334 applied by rotary actuator 300 on control surface 210. Thus, as load 222 in FIG. 2 changes, pressure 332 also may be varied to cause control surface 210 to move at a desired rate. In this manner, electronically controlled rotary actuator system 208 may operate to provide a desired operation of control surface 210.

For example, increasing the flow of current using command 326 increases the rate at which hydraulic pump 302 pumps fluid 316 into rotary actuator 300. This increased rate results in an increase in pressure 332 in the operation of rotary actuator 300 when load 222 is present on control surface 210. In a similar fashion, the flow of current may be reduced to decrease pressure 332. As depicted, pressure 332 may be varied during at least one of moving control surface 210 or maintaining the position of control surface 210 in desired position 320.

The varying of pressure 332 in rotary actuator 300 may be used to move control surface 210 in a desired manner. For example, the amount of force 334 on control surface 210 varies during different ones of phase of flight 324. When an aircraft is cruising, the amount of force needed to change the position of control surface 210 is less than when the aircraft is landing or taking off from an airport. In this manner, controller 308 may take into account information, such as phase of flight 324 and speed, in addition to desired position 320, when generating command 326.

In an illustrative example, mode control valve 310 is controlled by controller 308 to selectively send fluid 316 into rotary actuator 300. For example, fluid 316 may be sent into rotary actuator 300 in a manner that causes rotary actuator 300 to move in a desired direction. In the illustrative example, this movement is a rotary movement that may be clockwise or counterclockwise.

Further, mode control valve 310 may be used to enable or disable rotary actuator 300. For example, controller 308 may receive a command in addition to position command 318 to enable or disable rotary actuator 300. In turn, controller 308 may send mode command 336 to place mode control valve 310 into an enabled state, a disabled state, a maintenance state, or some other suitable state.

For example, if rotary actuator 300 is a backup actuator, rotary actuator 300 may normally be disabled. Rotary actuator 300 may be enabled if the main rotary actuator or other actuation system does not operate as desired. Further, rotary actuator 300 may be enabled if additional force is desired in moving control surface 210.

As depicted, housing 314 is a structure that is designed to contain rotary actuator 300, hydraulic pump 302, fluid reservoir 304, electric motor system 306, controller 308, and mode control valve 310. Housing 314 may be comprised of a material selected from one at least one of a composite, a plastic, a polycarbonate, a metal, aluminum, steel, titanium, or some other suitable material.

In this illustrative example, housing 314 with these components forms unit 338 in electronically controlled rotary actuator system 208. In other words, unit 338 is formed by housing 314 and the components that are located inside of housing 314. In this illustrative example, unit 348 includes the same components as unit 338. Unit 348 may function as a backup to unit 338.

For example, controller 308 may also indicate when rotary actuator 300 is not functioning as desired. Additionally, performance of rotary actuator 300 also may be affected indirectly through the performance of at least one of electric motor system 306, hydraulic pump 302, or mode control valve 310. A determination of whether rotary actuator 300 is performing as desired may be identified from position sensor 312. Controller 308 may determine whether the position of rotary actuator 300 is correct or reaches the desired position as quickly as expected from position data 328.

If rotary actuator 300 in unit 338 is not operating as desired, controller 308 may send alert 350 to flight control electronics 319. In response, flight control electronics 319 may activate a backup actuator in unit 348. For example, rotary actuator 352 may also be present in unit 338. In this example, mode control valve 310 may be controlled by controller 308 to activate rotary actuator 352 for use in place of rotary actuator 300. As a result, rotary actuator 352 may operate to exert force 354 on control surface 210.

As depicted, rotary actuator 352 also may have position sensor 356 that detects the position of rotary actuator 352. As depicted, position sensor 356 sends position data 358 to controller 308.

In another example, to increase the performance of unit 338, rotary actuator 352 may be activated for use in addition to rotary actuator 300. In other words, rotary actuator 300 may also exert force 354 in addition to force 334 exerted by rotary actuator 300.

In the illustrative example, one of rotary actuator 300 and housing 314 is connected to control surface 210. For example, rotary actuator 300 may be connected to control surface 210 while housing 314 is connected to a structure in aircraft 202 in FIG. 2. In another implementation, housing 314 is connected to control surface 210 while rotary actuator 300 is connected to the structure in aircraft 202. The structure may be, for example, a spar, a rib, or some other suitable structure.

As used herein, a first component, such as rotary actuator 300, "connected to" a second component, such as control surface 210, means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

Figure 4:
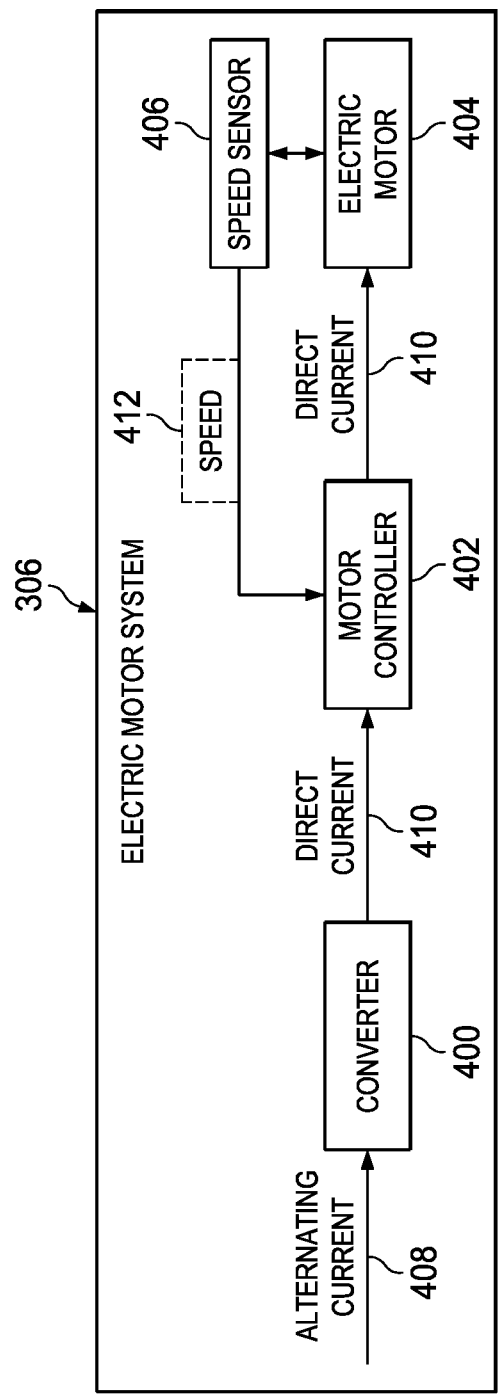
FIG. 4 is an illustration of a block diagram of an electric motor system in accordance with an illustrative embodiment.

Turning now to FIG. 4, an illustration of a block diagram of an electric motor system is depicted in accordance with an illustrative embodiment. Electric motor system 306 includes a number of different components. As depicted, electric motor system 306 includes converter 400, motor controller 402, electric motor 404, and speed sensor 406.

Converter 400 is an alternating current (AC) to direct current (DC) converter in this illustrative example. Converter 400 receives alternating current 408 from the current source and converts alternating current 408 to direct current 410 used in operating electric motor 404.

Motor controller 402 is the component in electric motor system 306 that receives command 326 from controller 308 in FIG. 3. As depicted, command 326 may take different forms. For example, command 326 may be a current command indicating how much current should be sent to electric motor 404. In other illustrative examples, command 326 may include a rate at which electric motor 404 should operate. This rate may be derived from rate 322 in position command 318 in FIG. 3. Rate 322 identifies a rate at which control surface 210 in FIGS. 2-3 should move. Controller 308 may calculate the rate at which electric motor 404 should operate to obtain rate 322 when moving control surface 210.

With rate 322 for electric motor 404, motor controller 402 controls the amount of direct current 410 sent to electric motor 404. In turn, electric motor 404 operates hydraulic pump 302 to pump fluid 316 in FIG. 3. In this illustrative example, speed sensor 406 detects speed 412 of electric motor 404 and sends speed 412 as feedback to motor controller 402. In this manner, motor controller 402 may vary the amount of direct current 410 to control speed 412 of electric motor 404.

As speed 412 of electric motor 404 increases, the speed at which hydraulic pump 302 pumps fluid 316 also increases. The pressure in rotary actuator 300 increases when a force is applied to control surface 210 in FIGS. 2-3 opposing the movement of control surface 210 to desired position 320 by rotary actuator 300 in FIG. 3. For example, a flow of air over control surface 210 during flight of aircraft 202 in FIG. 2 creates the force. This airflow causes an aerodynamic load which is also referred to as an air load. This force may vary because of at least one of the position of control surface 210 or the speed of aircraft 202.

As depicted, direct current 410 may be controlled to control the speed of electric motor 404. The speed of electric motor 404 controls how fast hydraulic pump 302 sends fluid 316 in FIG. 3 into rotary actuator 300.

The illustration of control surface environment 200 in FIG. 2 and the different components in FIGS. 1-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in another illustrative example, position sensor 312 in FIG. 3 may be a separate component located outside of electronically controlled rotary actuator system 208 in FIGS. 2-3. In another example, hydraulic pump 302 may also pump fluid 316 out of rotary actuator 300 to cause rotary movement in rotary actuator 300 in FIG. 3.

As another illustrative example, electronically controlled rotary actuator system 208 may comprise a group of rotary actuators in addition to rotary actuator 300. In yet another illustrative example, controller 308 may be located outside of housing 314 in FIG. 3.

Further, one or more housings in addition to housing 314 with hydraulic pumps, fluid reservoirs, and electric motor systems may be present in electronically controlled rotary actuator system 208. Each housing in the components in the housing may form a unit in electronically controlled rotary actuator system 208. Each of these units is controlled by controller 308. These additional housings with the components may be used to move the same control surface or a different control surface depending on the implementation.

Also, electronically controlled rotary actuator system 208 may be a backup system. For example, electronically controlled rotary actuator system 208 may be a backup to a hydraulic actuator system that is currently used to position control surfaces. In still another illustrative example, a position sensor, in addition to or in place of position sensor 312, may be used to detect the position of control surface 210 instead of detecting the position of rotary actuator 300. Thus, position data 328 in FIG. 3 may be obtained for at least one of rotary actuator 300 or control surface 210.

As another example, rotary actuator 352 may be located in a different housing from housing 314 for rotary actuator 300 in FIG. 3. In yet another illustrative example, one or more rotary actuators in addition to rotary actuator 300 and rotary actuator 352 may be connected to mode control valve 310 in FIG. 3.

In the illustrative examples, controller 308 in FIG. 3 and motor controller 402 in FIG. 4 are hardware components that may also include software, firmware, or a combination thereof. When software is used, the operations performed by these two components may be implemented in program code configured to run on hardware, such as a processor unit. When firmware is used, the operations performed by these two components may be implemented in program code and data and stored in persistent memory to run on a processor unit. The hardware may include circuits that operate to perform the operations in controller 308 and motor controller 402.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 5:
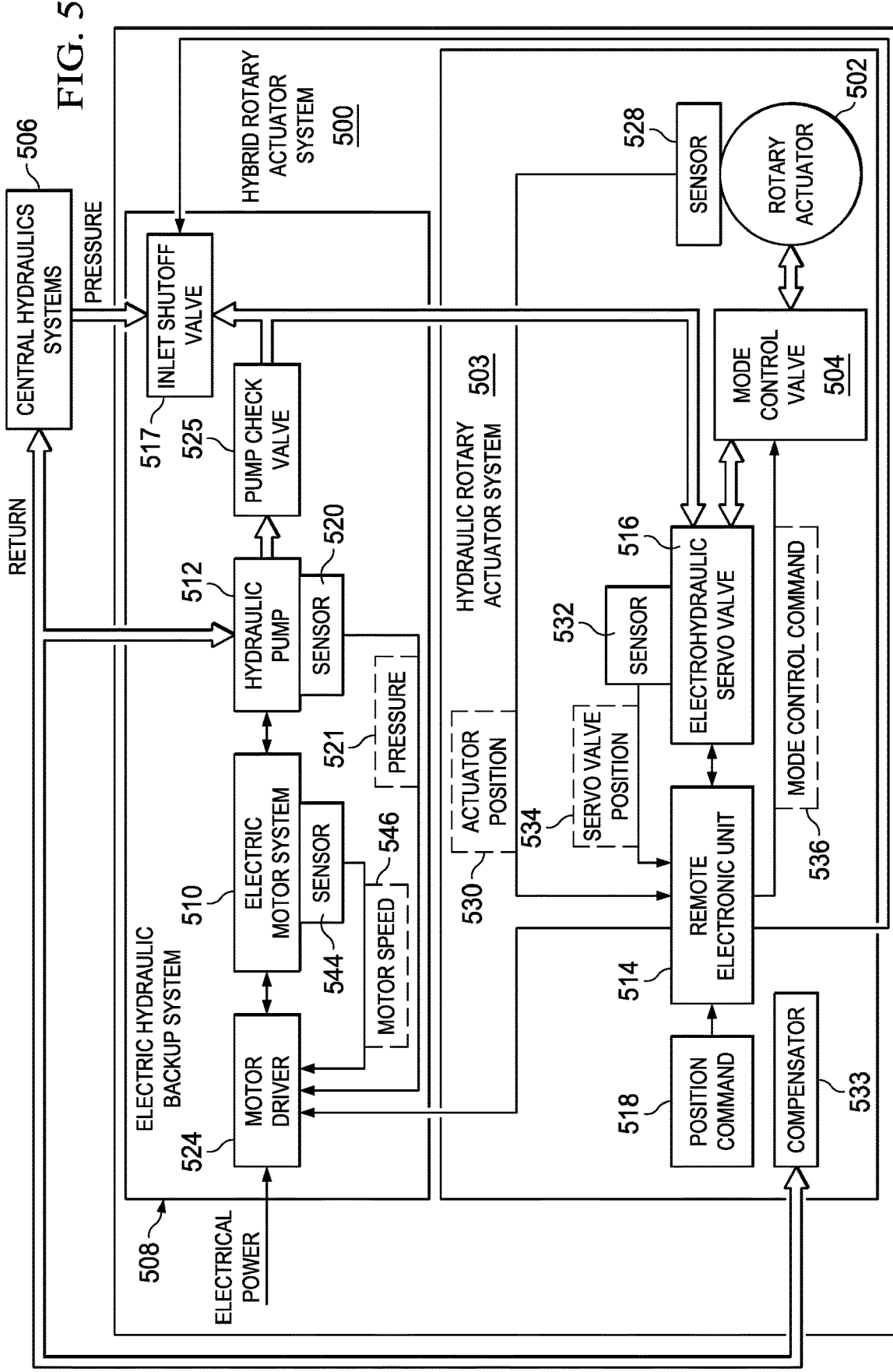
FIG. 5 is an illustration of a block diagram of a hybrid rotary actuator system in accordance with an illustrative embodiment.

With reference now to FIG. 5, an illustration of a block diagram of a hybrid rotary actuator system is depicted in accordance with an illustrative embodiment. In this illustrative example, hybrid rotary actuator system 500 is a hybrid system that includes components from an electrically controlled rotary actuator system and a hydraulics-based rotary actuator system.

As depicted, hybrid rotary actuator system 500 includes rotary actuator 502 located in hydraulic rotary actuator system 503 in which rotary actuator 502 is operated by fluid flow through mode control valve 504. In this illustrative example, hydraulic rotary actuator system 503 is an example of one implementation for hydraulic rotary actuator system 224 in FIG. 2.

Mode control valve 504 controls a source of fluid that moves rotary actuator 502. In this illustrative example, the source of the fluid is selected from at least one of central hydraulics systems 506 in an aircraft or electric hydraulic backup system 508. In other words, one or more of central hydraulics systems 506 may be used with a hydraulic backup system, such as electric hydraulic backup system 508.

Central hydraulics systems 506 may be located in a fuselage of the aircraft and are currently used hydraulic systems for operating rotary actuator 502. One or more of central hydraulics systems 506 may be located in the fuselage of the aircraft.

Electric hydraulic backup system 508 includes motor driver 524, electric motor system 510, and hydraulic pump 512. These components correspond to electric motor system 306 and hydraulic pump 302 in electronically controlled rotary actuator system 208 in FIG. 3. Electric hydraulic backup system 508 provides a backup to hydraulic rotary actuator system 503 powered by central hydraulics systems 506. Electric hydraulic backup system 508 is powered by electrical power as opposed to hydraulic power. If one or more of central hydraulics systems 506 do not perform as desired, electric hydraulic backup system 508 may provide a desired level of performance. In this manner, electrical power becomes backup actuation power for the fluid-based power used by hydraulic rotary actuator system 503 in which the fluid-based power is received from central hydraulics systems 506.

As depicted, the fluid from central hydraulics systems 506 is controlled by remote electronic unit 514 in conjunction with electrohydraulic servo valve (EHSV) 516. The fluid flows through inlet shutoff valve 517, which is connected to central hydraulics systems 506 and electrohydraulic servo valve 516. Inlet shutoff valve 517 is electronically controlled by remote electronic unit 514. In one position, inlet shutoff valve 517 enables the fluid to flow from central hydraulics systems 506 to rotary actuator 502. In another position, the fluid from central hydraulics systems 506 to rotary actuator 502 is shut off.

Inlet shutoff valve 517 shuts off the connection between central hydraulics systems 506 and electrohydraulic servo valve 516. In the illustrative example, this shutoff occurs prior to electric motor system 510 operating to cause hydraulic pump 512 to pump fluid into electrohydraulic servo valve 516. Electrohydraulic servo valve 516 is controlled by remote electronic unit 514.

In this illustrative example, remote electronic unit 514 receives position command 518. By using position command 518, remote electronic unit 514 controls electrohydraulic servo valve 516 to control the fluid sent into and out of rotary actuator 502 from central hydraulics systems 506.

Sensor 532 senses the position of electrohydraulic servo valve 516. Servo valve position 534 is sent to remote electronic unit 514. Sensor 528 senses the position of rotary actuator 502 in this illustrative example. Sensor 528 sends actuator position 530 to remote electronic unit 514. This feedback is used by remote electronic unit 514 to control the position of rotary actuator 502.

Compensator 533 is connected to central hydraulics systems 506 and hydraulic pump 512. Compensator 533 compensates for the loss of the fluid (due to external leakage). As depicted, the fluid in compensator 533 is used for the operation of hydraulic pump 512 in electric hydraulic backup system 508. In other examples, the fluid may be supplied from other sources, such as a local reservoir.

Motor driver 524 in electric hydraulic backup system 508 is controlled by remote electronic unit 514. Motor driver 524 controls the operation of electric motor system 510, which in turn controls the operation of hydraulic pump 512. Sensor 544 detects the speed at which electric motor system 510 operates. Sensor 544 sends back data to motor driver 524 in the form of motor speed 546. Motor speed 546 is used by motor driver 524 to adjust the operation of electric motor system 510 to a desired speed. Motor driver 524 may control the speed at which rotary actuator 502 moves from feedback in the form of motor speed 546.

Sensor 520 detects pressure 521 in hydraulic pump 512 and sends pressure 521 as feedback to motor driver 524. With pressure 521, motor driver 524 may adjust the operation of electric motor system 510.

Pump check valve 525 connects hydraulic pump 512 to electrohydraulic servo valve 516. Pump check valve 525 prevents fluid from central hydraulic systems 506 from entering into electric hydraulic backup system 508 when rotary actuator 502 is powered by central hydraulics systems 506.

Further, remote electronic unit 514 may generate mode control command 536 to control mode control valve 504. The state of mode control valve 504 is set to select the source for controlling rotary actuator 502.

For example, if remote electronic unit 514 determines that it is unable to control the movement of rotary actuator 502 in a desired manner, remote electronic unit 514 may change mode control valve 504 to allow electric hydraulic backup system 508 to control movement of rotary actuator 502. In a similar fashion, motor driver 524 also may generate mode control command 536 to change the position of mode control valve 504 such that rotary actuator 502 is moved by central hydraulics systems 506.

Figure 6:
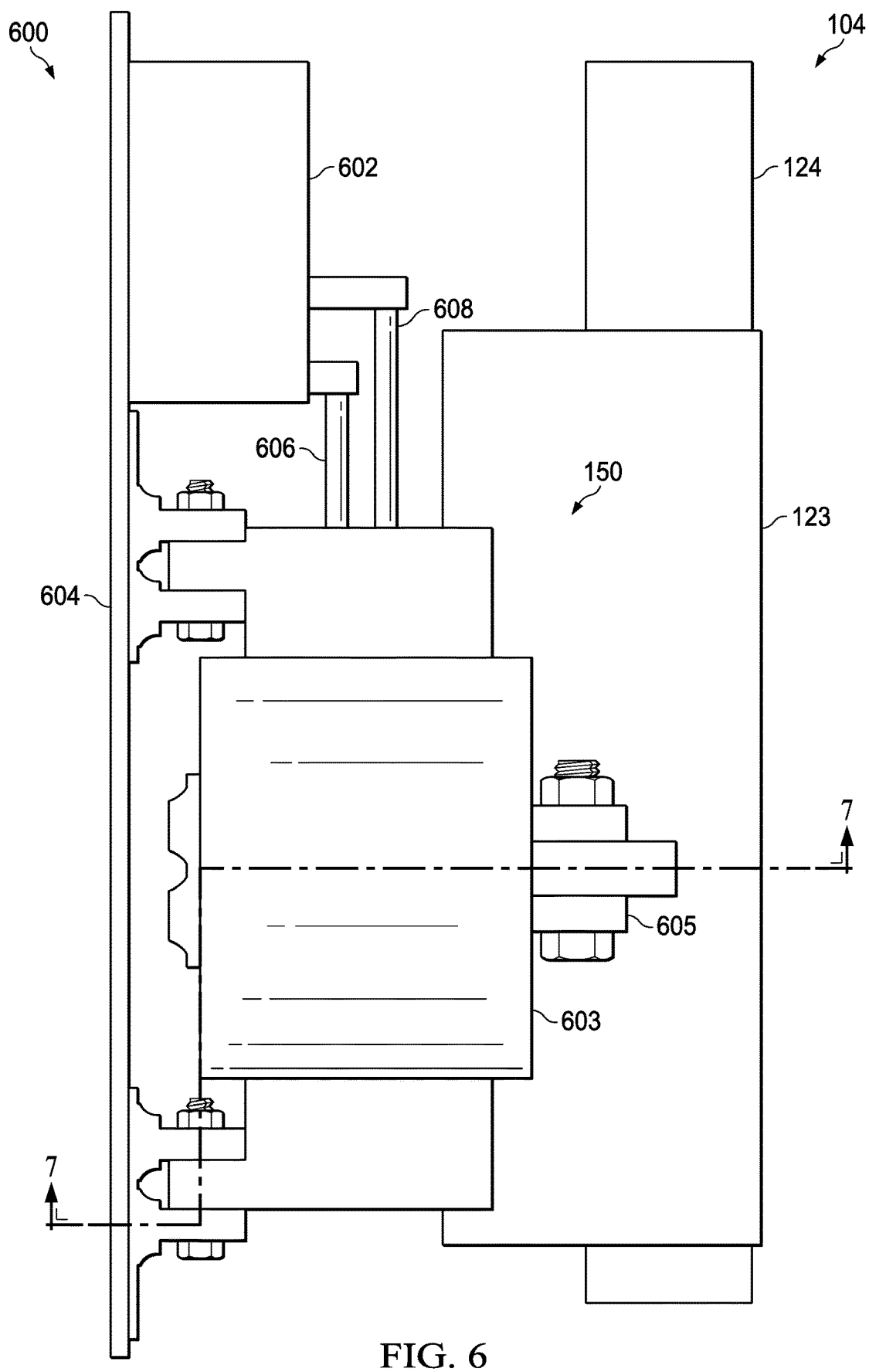
FIG. 6 is an illustration of an exposed view of a portion of a wing in accordance with an illustrative embodiment.

With reference next to FIG. 6, an illustration of an exposed view of a portion of a wing is depicted in accordance with an illustrative embodiment. In this illustrative example, an exposed view of section 150 on wing 104 is shown in the direction of lines 6-6 in FIG. 1.

In this view of section 150, electronically controlled rotary actuator system 600 moves spoiler 123 and is an example of an implementation of electronically controlled rotary actuator system 208 as shown in block form in FIG. 3. Only some structures and portions of some structures are shown in this exposed view to avoid obscuring the illustration and explanation of components in electronically controlled rotary actuator system 600.

In this depicted example, housing 602 and rotary piston actuator 603 for electronically controlled rotary actuator system 600 are shown connected to rear spar 604 in wing 104. A motor system and a hydraulic pump are located inside of housing 602. These components are located in the same structure, such as wing 104, instead of being in a remote central location, such as body 106 in FIG. 1. Although shown connected to rear spar 604, housing 602 and rotary piston actuator 603 are connected to each other via hydraulic line 606 and hydraulic line 608 and may be attached to any structure in wing 104. In this example, actuator output crank 605 is connected to spoiler 123 and moves spoiler 123.

Additionally, an output shaft for a rotary actuator (not shown) in electronically controlled rotary actuator system 600 is connected to aileron 124. Only a portion of aileron 124 is depicted in this figure to show electronically controlled rotary actuator system 600 and the location of electronically controlled rotary actuator system 600 with relation to aileron 124.

Figure 7:
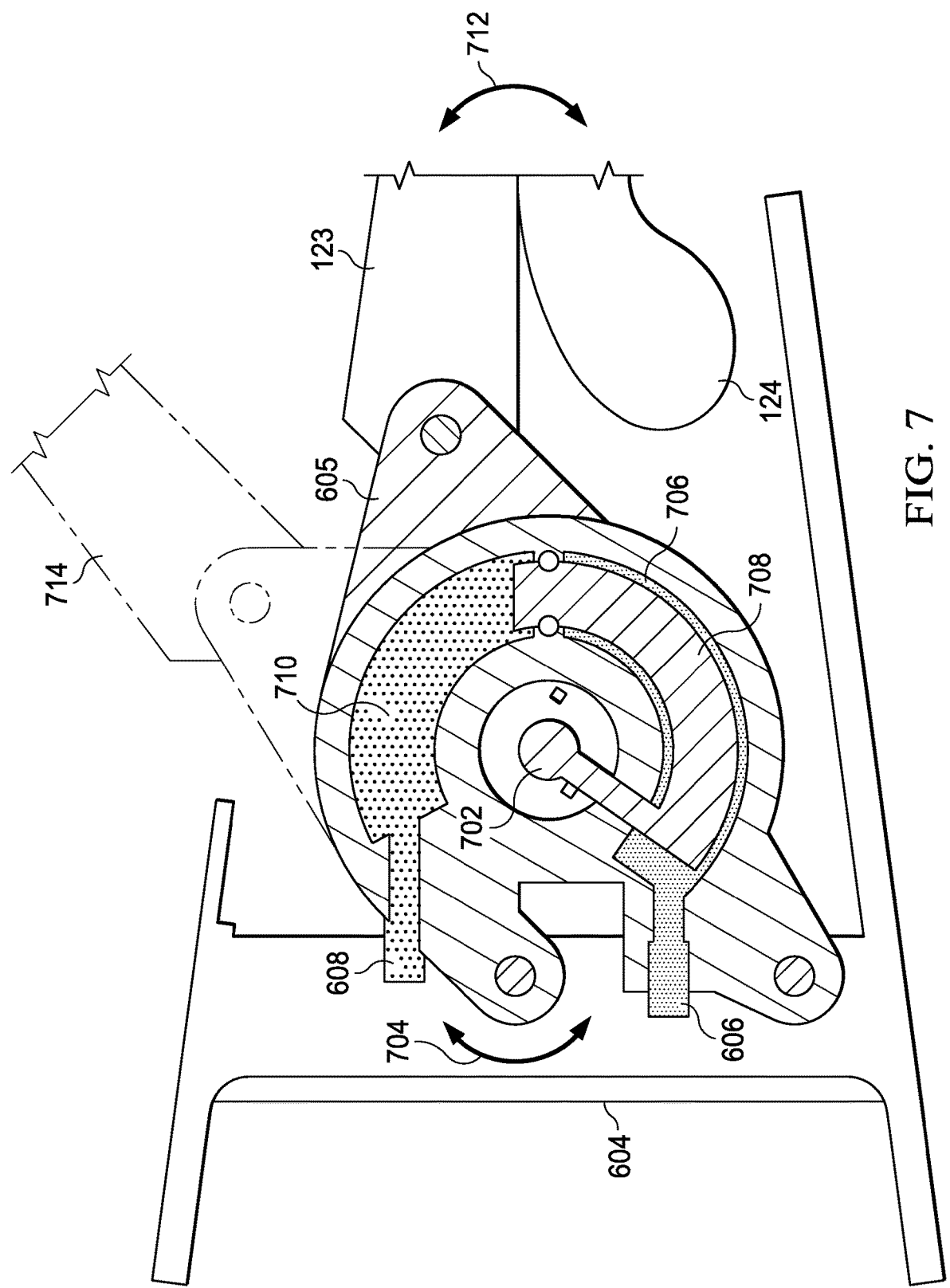
FIG. 7 is an illustration of a cross-sectional view of a portion of a wing with an electronically controlled rotary actuator system in accordance with an illustrative embodiment.

Turning now to FIG. 7, an illustration of a cross-sectional view of a portion of a wing with an electronically controlled rotary actuator system is depicted in accordance with an illustrative embodiment. As depicted, a cross-sectional view of a portion of wing 104 in section 150 taken along lines 7-7 in FIG. 6 is shown.

In this cross-sectional view, rotary piston actuator 603 moves output shaft 702 with rotational movement that is indicated by arrow 704. Output shaft 702 is connected to spoiler 123. The movement occurs in response to fluid being pumped through hydraulic line 606 into chamber 706, thus moving piston 708 in the counter-clockwise direction of arrow 704. The movement of output shaft 702 causes actuator output crank 605 and connected spoiler 123 to move relative to aileron 124 to a position shown by phantom line 714. Further, piston 708 may move clockwise when the fluid is pumped through hydraulic line 608 into chamber 710.

Figure 8:
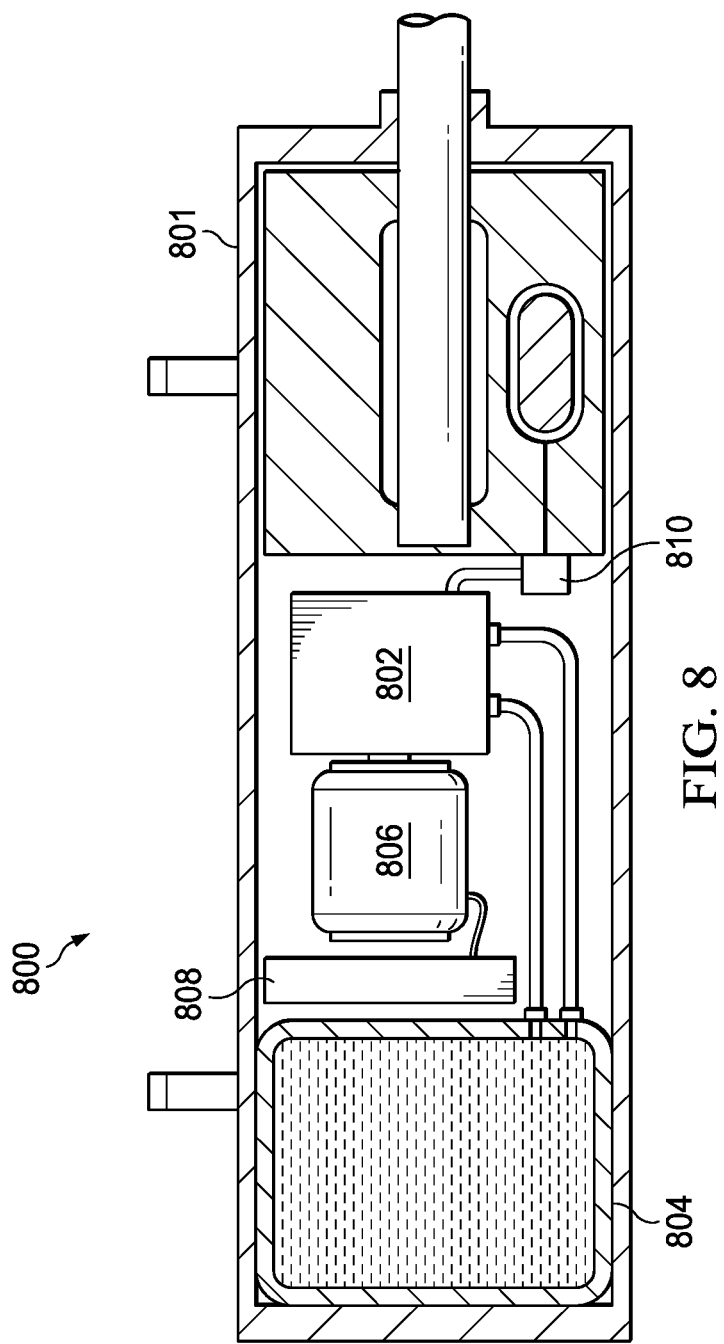
FIG. 8 is an illustration of components in an electronically controlled rotary actuator system in accordance with an illustrative embodiment.

With reference now to FIG. 8, an illustration of components in an electronically controlled rotary actuator system is depicted in accordance with an illustrative embodiment. In this example, a cross-sectional view of electronically controlled rotary actuator system 800 is shown. In this example, all of the components are located in housing 801 as compared to the example in FIGS. 6 and 7.

In this illustrative example, housing 801 holds electronically controlled rotary actuator system 800, hydraulic pump 802, fluid reservoir 804, electric motor system 806, controller 808, and mode control valve 810. These physical illustrations of the components within housing 801 are examples of implementations for the corresponding components shown in block form in FIG. 3 and are examples of one implementation for these components.

Figure 9:
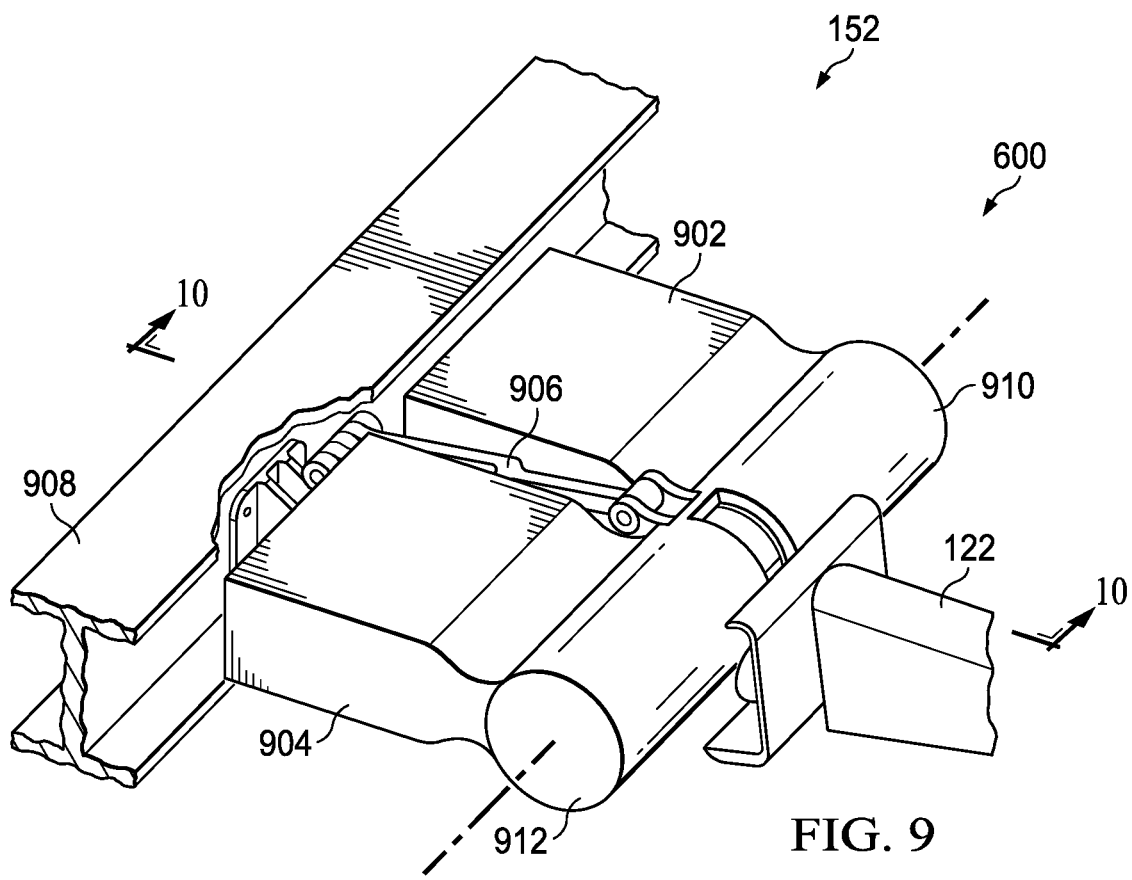
FIG. 9 is an illustration of another implementation of an electronically controlled rotary actuator system in accordance with an illustrative embodiment.

Turning next to FIG. 9, an illustration of another implementation of an electronically controlled rotary actuator system is depicted in accordance with an illustrative embodiment. In this illustrative example, electronically controlled rotary actuator system 600 is also located in trailing edge flap 122 as seen in this exposed view of section 152 on wing 104 as shown in the direction of lines 9-9 in FIG. 1. Only a portion of trailing edge flap 122 is shown in this example. Only some structures and portions of some structures are shown in this exposed view to avoid obscuring the illustration and description of components in electronically controlled rotary actuator system 600.

In this illustrative example, electronically controlled rotary actuator system 600 also includes housing 902 and housing 904 connected to linkage 906 and trailing edge flap 122. Linkage 906 is connected to rear spar 908. As depicted, housing 902 and housing 904 each contain components, such as rotary actuator 300, hydraulic pump 302, fluid reservoir 304, electric motor system 306, and mode control valve 310 as shown in block form in FIG. 3. Housing 902 and the components inside of housing 902 form unit 910, and housing 904 and the components inside of housing 904 form unit 912 in electronically controlled rotary actuator system 600.

In this illustrative example, a single controller (not shown) controls the components in both housing 902 and housing 904. In other illustrative examples, each housing may contain a controller.

Figure 10:
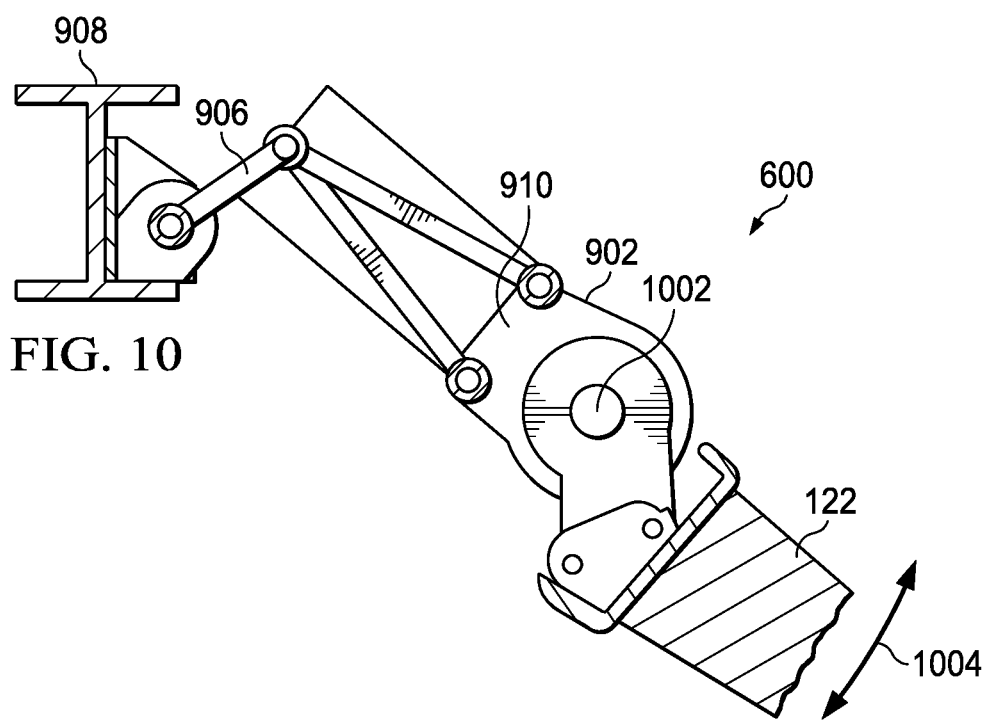
FIG. 10 is an illustration of a cross-sectional view of a portion of a wing with an electronically controlled rotary actuator system in accordance with an illustrative embodiment.

With reference next to FIG. 10, an illustration of a cross-sectional view of a portion of a wing with an electronically controlled rotary actuator system is depicted in accordance with an illustrative embodiment. In this figure, a cross-sectional view of electronically controlled rotary actuator system 600 is shown taken along lines 10-10 in FIG. 9.

As depicted in this view, linkage 906 is connected to rear spar 908 in wing 104 in FIG. 1. Additionally, linkage 906 is connected to housing 902. In turn, output shaft 1002 in housing 902 is connected to trailing edge flap 122. During operation of electronically controlled rotary actuator system 600, output shaft 1002 is rotated by one or more rotary actuators (not shown) located in at least one of housing 902 or housing 904 in FIG. 9 which moves trailing edge flap 122 in the direction of arrow 1004.

The illustrations of electronically controlled rotary actuator system 600 in FIGS. 6-10 are shown as examples of some physical implementations for electronically controlled rotary actuator system 208 and the components in electronically controlled rotary actuator system 208 as shown in block form in FIGS. 2-4. For example, although a unit in electronically controlled rotary actuator system 600 is shown as being directly connected to wing 104 and aileron 124 and two units are shown as being connected to linkage 906 and trailing edge flap 122, units for electronically controlled rotary actuator system 600 may be placed in other locations.

For example, electronically controlled rotary actuator system 600 may include a unit that is attached to a flap in a similar configuration with respect to at least one of a position or a location as shown for the unit including housing 602 and rotary piston actuator 603 in FIG. 6. In some examples, all of the components in the unit may be located in a single housing or structure. In other words, the unit in electronically controlled rotary actuator system 600 may be located at the end of a flap and positioned such that the output shaft of the actuator is part of the hinge for the flap. Another unit may be positioned on the other end of the flap to provide additional torque for use in positioning the flap.

Using two units with a flap provides increased performance of controlling movement of the flap over using a single unit since the size of the flap is typically larger than an aileron. In some illustrative examples, one or more units in addition to the units at the ends of the flaps may be integrated as part of the hinge line extending through the flap to provide additional torque for positioning the flap. A hinge line is an axis about which the flap, aileron, or other control surface rotates.

In one illustrative example, an electronically controlled rotary actuator system may be used to move any flight control surface. Traditional hydraulic, electro-hydrostatic, or electric backup hydraulic actuators have been linear, with appropriate connections between the fixed wing structure and the moveable surface. An electronically controlled rotary actuator system may be integrated directly on the hinge line of any flight control surface. This rotary electronically controlled hydraulic actuator system may have remote electronics, a motor, a pump, a hydraulic manifold, and valves to control hydraulic flow to the rotary hydraulic actuator in the electronically controlled rotary actuator system. Alternatively, the rotary actuator can be mounted off the hinge line and have a kinematic linkage between the output of the actuator and the hinge line.

As another example, if the required diameter of the rotary actuator is too large to fit in the integration space, (1) the span of the actuator may be increased by increasing the number of "slices" and have a common output shaft or (2) the rotary actuator may be mounted elsewhere and have a torque tube lead out to the hinge line of the control surface.

Increasing the span of the rotary actuator may be more amenable to long, thin, and stiff wings in which integrating a torque tube may be more difficult. Using the torque tube is more amenable to empennage applications where additional space can typically be found near the fuselage join, or at inboard locations of the wing, where the wing joins with the fuselage. These empennage applications may be a rudder, an elevator, or some other suitable flight control surface.

As another illustrative example, the units in electronically controlled rotary actuator system 600 may be used to move other control surfaces. For example, the units may be connected to leading edge flap 120, rudder 126, elevator 128, and other control surfaces to move these control surfaces for aircraft 100 in FIG. 1. In still other illustrative examples, the housing may be part of a structure rather than a separate component that is connected to a structure in aircraft 100. For example, housing 602 may be formed as part of rear spar 604 in FIG. 6 in another illustrative example.

Figure 11:
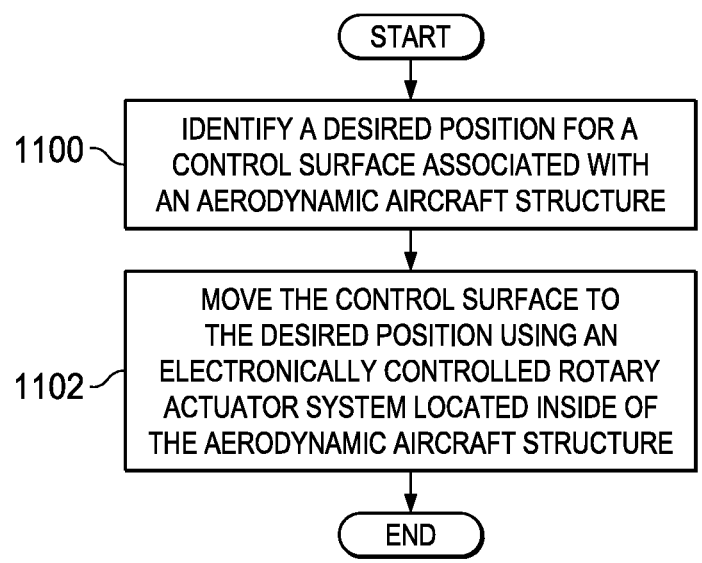
FIG. 11 is an illustration of a flowchart of a process for positioning a control surface in accordance with an illustrative embodiment.

Turning next to FIG. 11, an illustration of a flowchart of a process for positioning a control surface is depicted in accordance with an illustrative embodiment. The process illustrated in FIG. 11 may be implemented in control surface environment 200 in FIG. 2 and may be implemented using electronically controlled rotary actuator system 208 in aircraft control surface system 204 to move control surface 210 for aircraft 202 in FIG. 2.

The process begins by identifying a desired position for a control surface associated with an aerodynamic aircraft structure (operation 1100). The process moves the control surface to the desired position using an electronically controlled rotary actuator system located inside of the aerodynamic aircraft structure (operation 1102) with the process terminating thereafter. In this example, the shape of the aerodynamic aircraft structure with the electronically controlled rotary actuator system has a desired aerodynamic performance.

Figure 12:
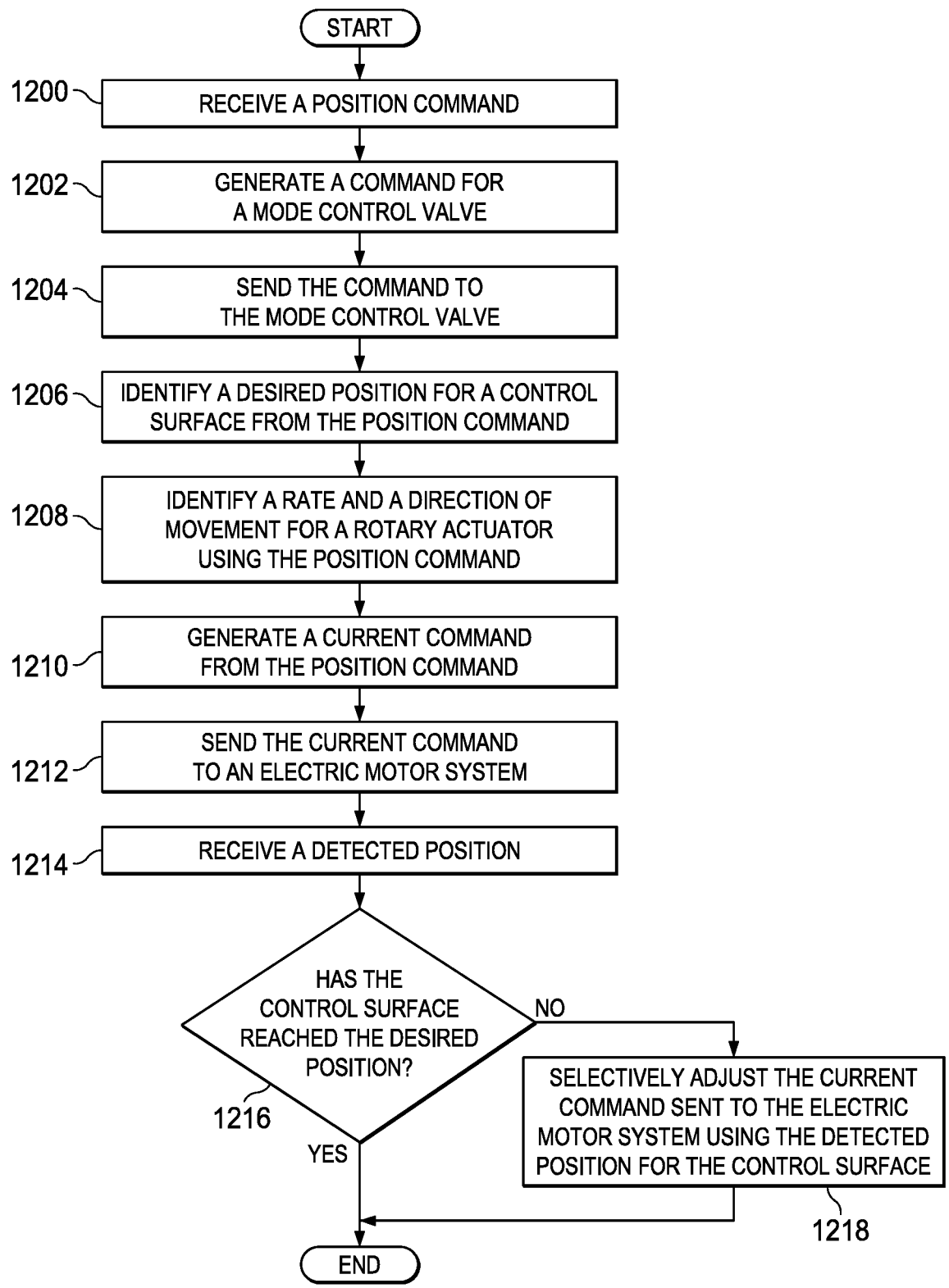
FIG. 12 is an illustration of a flowchart of a process for controlling movement of a control surface in accordance with an illustrative embodiment.

With reference now to FIG. 12, an illustration of a flowchart of a process for controlling movement of a control surface is depicted in accordance with an illustrative embodiment. The process illustrated in FIG. 12 is a more detailed example of one manner in which a control surface may be positioned. The flowchart in this process may be implemented in controller 308 in FIG. 3 in electronically controlled rotary actuator system 208 in FIG. 2 to control the operation of electric motor system 306 and hydraulic pump 302 in FIG. 3 to move control surface 210 in FIG. 2 to desired position 320 in FIG. 3.

The process begins by receiving a position command (operation 1200). In this example, the position command includes a desired position, such as desired position 320.

Next, the process generates a command for a mode control valve (operation 1202). The process then sends the command to the mode control valve (operation 1204). The command places the mode control valve in a configuration such that when fluid is pumped into the rotary actuator, the rotary actuator moves in a desired direction, such as clockwise or counterclockwise. The process identifies a desired position for a control surface from the position command (step 1206).

Additionally, the position command also may include least one of a rate, a phase of flight, or other suitable information. The process identifies a rate and a direction of movement for a rotary actuator using the position command (operation 1208).

The process generates a current command from the position command (operation 1210). The current command is selected to cause the electric motor system to operate in a manner that causes the hydraulic pump to pump the fluid into the rotary actuator. The command results in the fluid being pumped into the rotary actuator at a rate that results in the rotary actuator moving the control surface at the rate in the position command. The process sends the current command to an electric motor system (operation 1212).

The process then receives a detected position (operation 1214). This detected position is feedback for the position of at least one of the rotary actuator or the control surface. In operation 1214, position information may be received from at least one of a sensor for the rotary actuator or the control surface.

A determination is made as to whether the control surface has reached the desired position (operation 1216). This determination is made using the detected position received in operation 1214. If the control surface has reached the desired position, the process terminates.

Otherwise, the process selectively adjusts the current command sent to the electric motor system using the detected position for the control surface (operation 1218). The process terminates thereafter.

In selectively adjusting the current command in operation 1218, no change may be made to the current command. In other illustrative examples, the current command may increase or decrease the amount of current.

Figure 13:
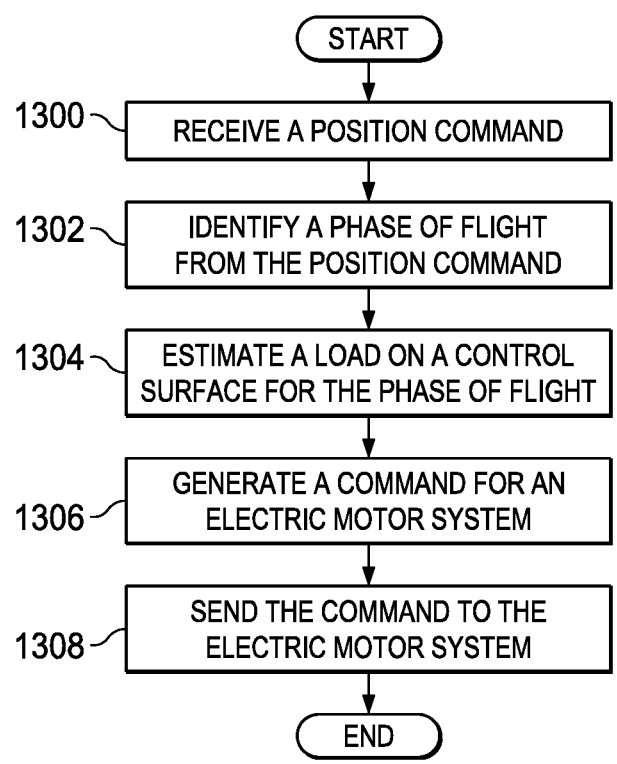
FIG. 13 is an illustration of a flowchart of a process for controlling pressure in an actuator using a phase of flight in accordance with an illustrative embodiment.

Turning next to FIG. 13, an illustration of a flowchart of a process for controlling pressure in an actuator using a phase of flight is depicted in accordance with an illustrative embodiment. In this illustrative example, the phase of flight may be used to predict an amount of load that may occur on a control surface and take into account a predicted mode in moving the control surface.

The process begins by receiving a position command (operation 1300). In this example, the position command includes a desired position, a rate, and a phase of flight. The process identifies a phase of flight from the position command (operation 1302). In this example, the position command also includes the phase of flight in addition to the desired position for the control surface.

The process estimates a load on a control surface for the phase of flight (operation 1304). The process may take into account parameters, such as speed, the current position of the control surface, the desired position of the control surface, the rate of movement for the control surface, and other suitable parameters.

The process generates a command for an electric motor system (operation 1306). In this example, the command tells the electric motor system how fast to operate, which in turn controls how fast fluid is pumped into the rotary actuator. This command is generated such that the rotary actuator moves the control surface from the current position towards the desired position with the desired rate of movement.

The process sends the command to the electric motor system (operation 1308) with the process terminating thereafter. This process may be repeated any number of times. For example, the process may be repeated if feedback on the position of the rotary actuator is received in position data from a position sensor. The position of the rotary actuator may be used to calculate the position of the control surface.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, in operations 1210-1212 and operation 1216, current commands are used to control an electric motor system. In other illustrative examples, other types of commands may be used such as a voltage command or some other command that may be used to control an operation of the electric motor system.

Figure 14:
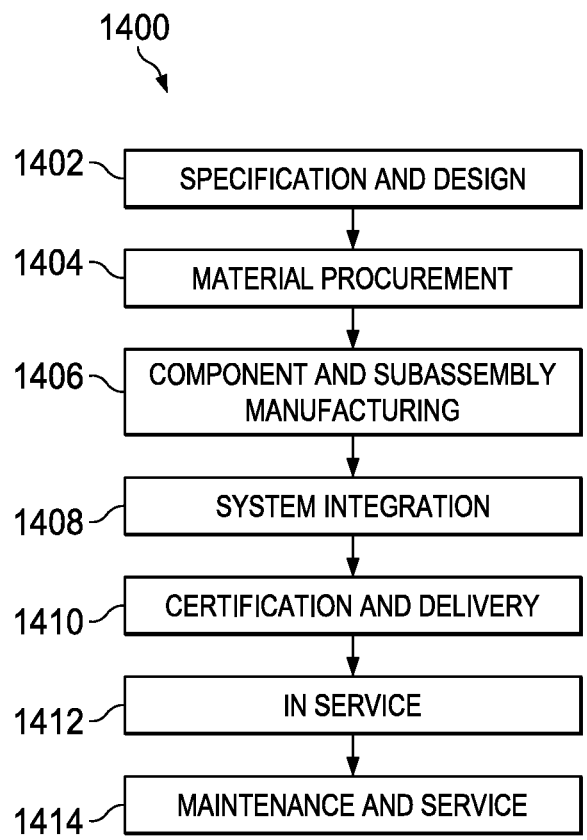
FIG. 14 is an illustration of a block diagram of an aircraft manufacturing and service method in accordance with an illustrative embodiment.
Figure 15:
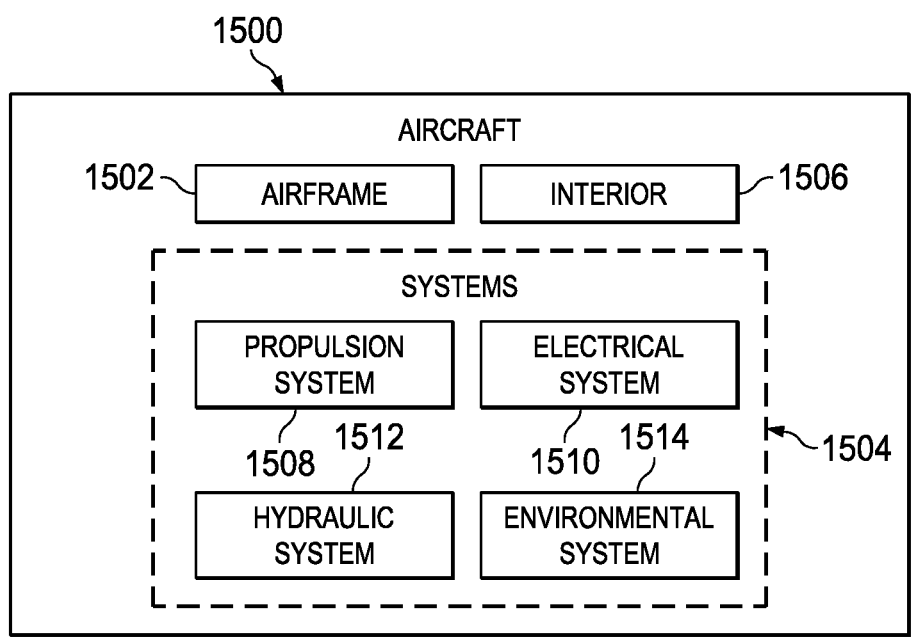
FIG. 15 is an illustration of a block diagram of an aircraft in which an illustrative embodiment may be implemented.

The illustrative embodiments of the present disclosure may be described in the context of aircraft manufacturing and service method 1400 as shown in FIG. 14 and aircraft 1500 as shown in FIG. 15. Turning first to FIG. 14, an illustration of a block diagram of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404. Aircraft 1500 shows examples of systems that may be found in aircraft 100 in FIG. 1 and aircraft 202 in FIG. 2.

During production, component and subassembly manufacturing 1406 and system integration 1408 of aircraft 1500 takes place. An electronically controlled greater actuator system may be manufactured and integrated into aircraft 1500 during component and subassembly manufacturing 1406 and system integration 1408 of aircraft 1500.

Thereafter, aircraft 1500 may go through certification and delivery 1410 in order to be placed in service 1412. The electronically controlled rotary actuator system may operate to position control surfaces for aircraft 1500 during certification and delivery 1410 and in service 1412.

While in service 1412 by a customer, aircraft 1500 is scheduled for routine maintenance and service 1414, which may include modification, reconfiguration, refurbishment, and other maintenance or service. In one illustrative example, an electronically controlled rotary actuator system may be installed in aircraft 1500 as part of modification, reconfiguration, or refurbishment of aircraft 1500.

Each of the processes of aircraft manufacturing and service method 1400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of a block diagram of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. In one illustrative example, components or subassemblies produced in component and subassembly manufacturing 1406 in FIG. 14 for an electronically controlled rotary actuation system may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14.

One or more apparatus embodiments, method embodiments, or a combination thereof may be utilized while aircraft 1500 is in service 1412, during maintenance and service 1414 in FIG. 14, or both. The use of a number of the different illustrative embodiments may substantially expedite the assembly of aircraft 1500, reduce the cost of aircraft 1500, or both expedite the assembly of aircraft 1500 and reduce the cost of aircraft 1500. For example, installing wires and other components for an electronically controlled rotary actuator system may be less complex and take less time than installing hydraulic lines for a linear actuator system.

Thus, the illustrative embodiments provide a method and apparatus for positioning control surfaces. The electronically controlled rotary actuator system in the different illustrative examples increases the efficiency at which aircraft engines may operate. For example, with the electronically controlled rotary actuator system, less or no bleed air is needed to control movement of control surfaces. As a result, improved engine efficiency and fuel use occurs. Further, the electronically controlled rotary actuator system may be used as a backup to address issues when a loss of hydraulics occurs in the aircraft such that safety is increased. In other illustrative examples, the electronically controlled rotary actuator system may be used in place of currently used hydraulic systems for moving the control surfaces.

The use of electronically controlled rotary actuator systems may replace the hydraulic systems currently used in aircraft for positioning the control systems. As a result, weight savings may occur for an aircraft with an electronically controlled rotary actuator system used in the aircraft. In the illustrative examples, each system, the rotary actuator, the electric motor system, and the hydraulic pump, are located locally within the aerodynamic aircraft structure.

Additionally, the use of electronically controlled rotary actuator systems may result in a cheaper and lighter wing as compared to using linear actuators. Additionally, the use of electronically controlled rotary actuator systems results in simpler designs and a higher loading in the same space as compared to linear actuator systems. Additionally, the aircraft building process may be simplified by incorporating more electric flight control architectures and rotary hinge line control architectures, wherein the actuators are essentially a powered hinge to the surface.

Additionally, electric flight control architectures lend themselves to a simpler power transport element installation. As a result, the use of the electric flight control architectures with rotary hinge line control architectures that use rotary hinge line actuation also optimizes aircraft wing buildup, thus an original equipment manufacturer of aircraft may reduce the cost to build the aircraft while meeting more stringent aircraft performance requirements. As a result, increased flexibility in flexible installation geometries and a reduction of integration burden on original equipment manufacturers of aircraft are present.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Further, many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft control surface system that comprises:
   a control surface associated with an aerodynamic aircraft structure; and
   an electronically controlled rotary actuator system located inside of the aerodynamic aircraft structure, the electronically controlled rotary actuator system configured to:
      associated with the control surface; and
      responsive to a position command and a load on the control surface, vary a pressure from a rotary actuator to position the control surface, such that the rotary actuator comprises:
         a diameter less than a thickness of the aerodynamic aircraft structure; and
         a single piston that comprises an arcuate shape connected to an output shaft and located wholly within a single chamber that comprises:
            an arcuate shape;
            a first hydraulic line at a first end of the single chamber; and
            a second hydraulic line at a second end of the single chamber;
         a hydraulic pump connected to the rotary actuator and configured to send fluid into the rotary actuator; and
         an electric motor system configured to cause the hydraulic pump to send the fluid into the rotary actuator and move the control surface towards a desired position.

2. The aircraft control surface system of claim 1 further comprising:
   a controller that receives a position command comprising the desired position for the control surface and sends a command, based upon the position command, to the electric motor system, wherein the command is selected to cause the electric motor system to operate the hydraulic pump to send the fluid into the rotary actuator such that the control surface moves towards the desired position.

3. The aircraft control surface system of claim 2, further comprising the controller configured to adjust, based upon a detected position for the control surface, the command sent to the electric motor system.

4. The aircraft control surface system of claim 2, wherein the position command further comprises at least one of: a rate at which the control surface moves, or a phase of flight present when the control surface moves.

5. The aircraft control surface system of claim 1, wherein the electronically controlled rotary actuator system further comprises a housing, wherein the rotary actuator, the hydraulic pump, and the electric motor system are located inside of the housing.

6. The aircraft control surface system of claim 1, wherein the output shaft for the rotary actuator is connected to the control surface.

7. The aircraft control surface system of claim 1, wherein the rotary actuator is connected to the aerodynamic aircraft structure.

8. The aircraft control surface system of claim 1, further comprising a backup to a hydraulic rotary actuator system comprising the electronically controlled rotary actuator system.

9. The aircraft control surface system of claim 1, wherein the electronically controlled rotary actuator system further comprises a group of rotary actuators in addition to the rotary actuator.

10. The aircraft control surface system of claim 1, wherein the aerodynamic aircraft structure is selected from one of a wing, a horizontal stabilizer, and a vertical stabilizer.

11. The aircraft control surface system of claim 1, wherein the control surface is selected from one of a flap, a slat, a flaperon, an aileron, a rudder, an elevator, and a spoiler.

12. An aircraft control surface system that comprises:
    a control surface that is associated with an aerodynamic aircraft structure;
    a rotary actuator that comprises:
       a diameter less than a thickness of the aerodynamic aircraft structure; and
       an output shaft connected to a single piston that comprises an arcuate shape located wholly within a single chamber that comprises:
          an arcuate shape;
          a first hydraulic line at a first end of the single chamber; and
          a second hydraulic line at a second end of the single chamber;
    a hydraulic pump that is connected to the rotary actuator, the hydraulic pump configured to send fluid into the rotary actuator;
    an electric motor system configured to cause the hydraulic pump to send the fluid into the rotary actuator and cause the output shaft to move the control surface with a variable pressure towards a desired position;
    a housing that contains: the rotary actuator, the hydraulic pump, and the electric motor system; and
    a controller configured to:
       receive a position command that comprises the desired position for the control surface; and
       send a command, based upon the position command and a force on the control surface, to the electric motor system, such that the command directs the electric motor system to operate the hydraulic pump to send the fluid into the rotary actuator such that the output shaft moves the control surface towards the desired position.

13. A method for positioning a control surface, the method comprising:
    identifying a desired position for the control surface that is associated with an aerodynamic aircraft structure; and
    moving the control surface to the desired position using an electronically controlled rotary actuator system located inside of the aerodynamic aircraft structure, via, responsive to a force upon the control surface, varying an output of a hydraulic motor controlling flow of hydraulic fluid into a rotary actuator comprising a single chamber comprising an arcuate shape and containing:

a first hydraulic input line at a first end of the single chamber;
a second hydraulic input line at a second end of the single chamber; and
a single piston comprising an arcuate shape and connected to the control surface.

14. The method of claim 13, wherein identifying the desired position for the control surface that is associated with the aerodynamic aircraft structure comprises:
receiving a position command; and
identifying, from the position command, the desired position for the control surface.

15. The method of claim 14 further comprising:
generating, from the position command, a command; and
sending the command, based upon the position command, to an electric motor system and causing the electric motor system to operate a hydraulic pump sending fluid into the rotary actuator such that an output shaft moves the control surface towards the desired position.

16. The method of claim 15 further comprising:
receiving a detected position from a position sensor for the control surface; and
selectively adjusting the command sent to the electric motor system using the detected position for the control surface.

17. The method of claim 15, wherein the position command further comprises at least one of a: a rate at which the control surface moves, or a phase of flight present when the control surface moves.

18. The method of claim 14, wherein the rotary actuator, a hydraulic pump, and an electric motor system are located inside of a housing.

19. The method of claim 13, wherein the electronically controlled rotary actuator system comprises the rotary actuator, wherein the rotary actuator moves an output shaft; a hydraulic pump that is connected to the rotary actuator, wherein the hydraulic pump sends fluid into the rotary actuator; and an electric motor system that is operable to cause the hydraulic pump to send the fluid into the rotary actuator resulting in the output shaft moving the control surface towards the desired position.

20. The method of claim 13, wherein an output shaft is connected to the control surface.

21. The method of claim 13, wherein the rotary actuator is connected to the aerodynamic aircraft structure.

22. The method of claim 13, wherein the electronically controlled rotary actuator system is a backup to a hydraulic rotary actuator system.

23. The method of claim 14, wherein the electronically controlled rotary actuator system comprises a group of rotary actuators in addition to the rotary actuator.

24. A hybrid rotary actuator system that comprises:
a hydraulic rotary actuator system that comprises:
a rotary actuator connected to a control surface and configured to move the control surface based upon a position command and a load on the control surface, such that the rotary actuator comprises:
a diameter less than a thickness of an aerodynamic aircraft structure associated with the control surface; and
a single piston that comprises an arcuate shape connected to an output shaft and located wholly within a single chamber that comprises:
an arcuate shape;
a first hydraulic line at a first end of the single chamber; and
a second hydraulic line at a second end of the single chamber;
a hydraulic pump connected to the rotary actuator and configured to send fluid into the rotary actuator; and
an electric motor system configured to cause the hydraulic pump to send the fluid into the rotary actuator and move the control surface towards a desired position;
an electrohydraulic servo valve configured to control fluid sent into and out of the rotary actuator;
a remote electronic unit configured to control the electrohydraulic servo valve based upon the position command; and
an electric hydraulic backup system that comprises:
the hydraulic pump configured to pump fluid through the electrohydraulic servo valve;
the electric motor system configured to control the hydraulic pump based upon the position command and the load on the control surface;
an inlet shutoff valve that connects a central hydraulics systems to the electrohydraulic servo valve; and
a motor driver controlled by the remote electronic unit when the hydraulic rotary actuator system does not operate as desired, such that:
the remote electronic unit is configured to shutoff a connection to the central hydraulics systems;
the motor driver is configured to control the electric motor system; and
the electric hydraulic backup system is configured to backup the hydraulic rotary actuator system.

* * * * *